Dec. 22, 1931.   A. V. BODINE   1,837,699
RECORD RESURFACING MACHINE
Original Filed Nov. 2, 1927   4 Sheets-Sheet 2

INVENTOR.
A. V. Bodine,
BY
ATTORNEY.

Dec. 22, 1931.　　　A. V. BODINE　　　1,837,699
RECORD RESURFACING MACHINE
Original Filed Nov. 2, 1927　　4 Sheets-Sheet 3
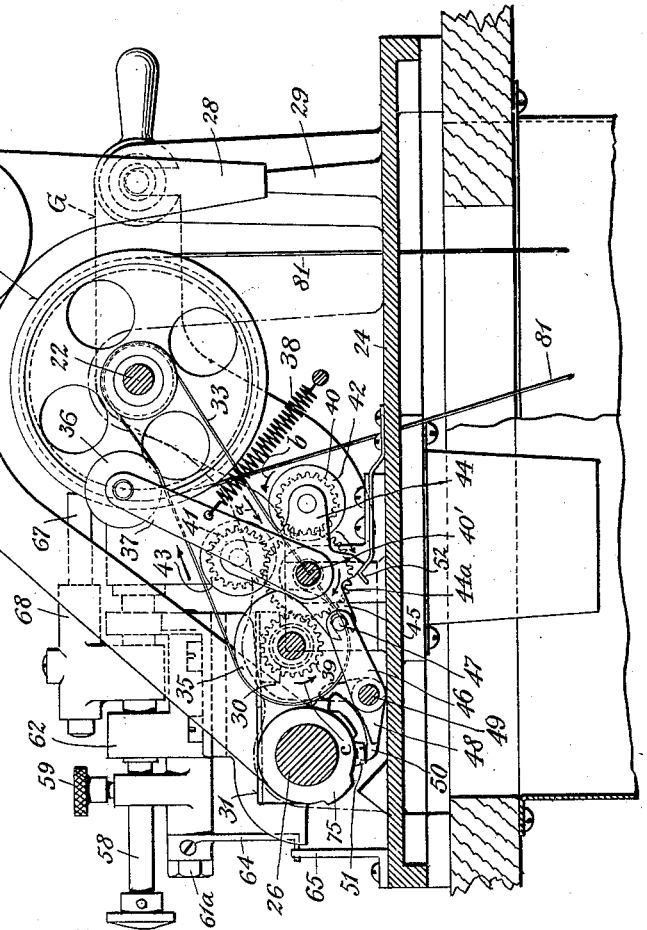
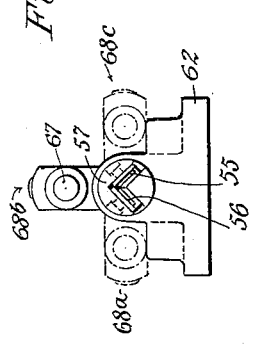
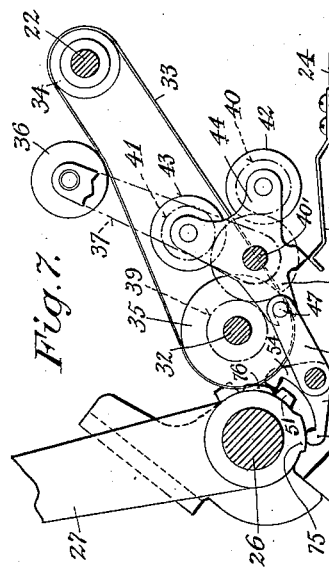
INVENTOR.
A. V. Bodine,
BY
ATTORNEY

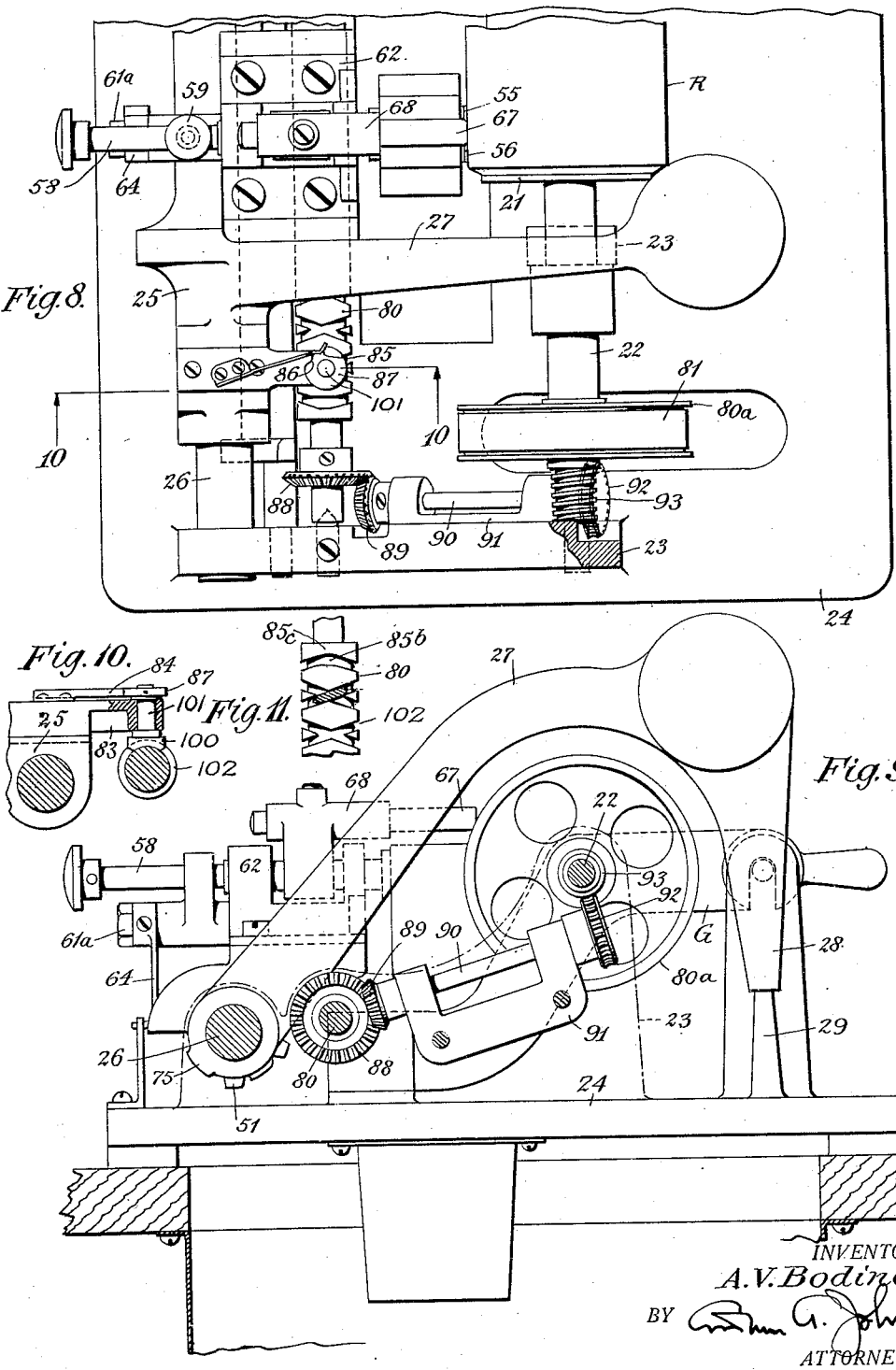

Patented Dec. 22, 1931

1,837,699

UNITED STATES PATENT OFFICE

ALFRED V. BODINE, OF FAIRFIELD, CONNECTICUT, ASSIGNOR TO DICTAPHONE CORPORATION, OF BRIDGEPORT, CONNECTICUT, A CORPORATION OF NEW YORK

RECORD RESURFACING MACHINE

Application filed November 2, 1927, Serial No. 230,575. Renewed May 8, 1931.

This invention relates to machines for resurfacing phonograph record blanks, more particularly record blanks for commercial phonographs.

Briefly described, the machines now in use for resurfacing phonograph record blanks comprise a mandrel for supporting a record blank for rotation, and a cutting knife mounted in a carriage which is moved longitudinally of the record by a feed screw driven coordinately with the mandrel of the record blank. The knife is manually adjustable to bring its cutting face toward and away from the record surface, in order to cause a cut of desired depth to be taken from the record surface, thereby to remove all traces of record indentations which may have been previously placed or inscribed thereon.

In order to produce the best result in recording on the surface of the record, it is customary in the operation of the resurfacing of the machine, to cause the knife to take, at first, a "rough cut" to remove practically all of the wax necessary to leave the surface smooth, and, subsequently, to take another or finishing cut which will remove any unevenness which may have been left after the taking-off of the first cut, and to leave the record surface in practically polished condition.

An object of the present invention is to provide means for causing a record-engaging tool to complete the resurfacing of a record blank in one cycle of the tool's reciprocation along the record surface from and to starting position. This is accomplished in the form of the invention at present preferred by causing the knife to take the first or roughing cut during movement from starting position, then reversing the movement of the knife so it will travel in the other direction, returning to its starting position, and causing the knife to produce a finishing or polishing cut during the return movement.

In the form of the invention at present preferred, a pair of knives or knife-edges are provided adjacent each other on the knife-bar, one knife-edge being adapted to take the rough cut when the carriage moves in one direction, and the other knife-edge to take the finishing cut when the carriage moves in the opposite direction.

A further feature of the invention resides in the provision of means whereby the carriage will be caused to make one complete cycle of traverse, or a back and forth movement, and for automatically interrupting any further movement of the carriage at that time.

Further objects and advantages of the invention will hereinafter appear.

In the accompanying drawings—

Fig. 4 is an end view of the machine, a portion thereof being removed, and taken on the line 4—4, Fig. 1.

Fig. 5 is a front view of the knife-carrying block.

Figs. 6 and 7 illustrate, respectively, different positions of some of the parts shown in Fig. 4.

Fig. 8 is a plan view of a modification of the invention shown in Figs. 1 to 7.

Fig. 9 is an end view of the device shown in Fig. 8.

Fig. 10 is a section taken on the line 10—10, Fig. 8.

Fig. 11 shows the end portion of the feed-screw shown in Fig. 8.

Figure 1:
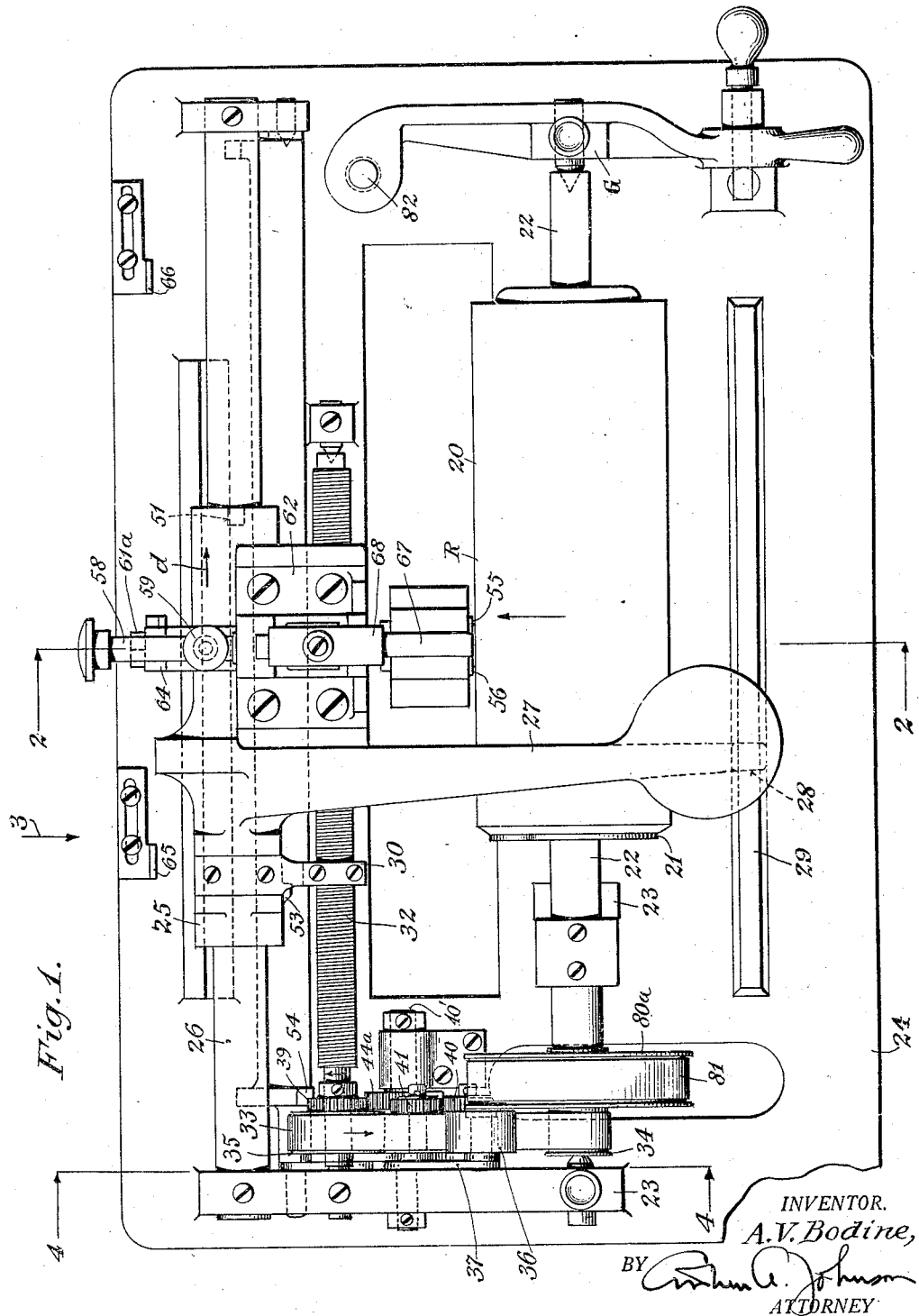
Figure 1 is a plan view of the record-resurfacing machine, showing the present invention embodied therein.

In the machine shown in the accompanying drawings, a record blank 20 which is intended to be resurfaced, is supported upon a mandrel 21 carried by a shaft 22 mounted in standards 23 forming a part of a base plate 24.

The cutting or other resurfacing tool or device, hereinafter referred to in detail and which operates upon the record blank to resurface the same, is mounted on a reciprocating carriage 25 slidably mounted at its rear on a guide rod 26 and having a forwardly extending goose-neck portion 27 provided with a bearing-shoe 28 which rides on a front rail 29, as shown in Fig. 4. In the form of the invention shown in Figs. 1 to 8, the carriage 25 is caused to travel not only from but to normal starting position, parallel with the axis of the mandrel 21, by a feed-nut 30 secured thereto and normally in engagement with a feed-screw 32 which is rotated co-ordinately with the mandrel 21 by a belt 33 but in one direction or the other, according to which direction the carriage is to move in. The belt 33 is held taut between a pulley 34 secured to the mandrel shaft 22 and a pulley 35 loosely mounted for rotation on a shank-portion of the feed-screw 32 by a belt-tightener which comprises an idler 36, an arm 37 pivoted with its other end on a fixed point of the base plate, and a spring 38 for holding the arm 37 in operative position. Movement in proper direction is imparted to the feed-screw by intervening mechanism which comprises a pinion 39 secured to the feed-screw 32, an intermediate gear 44a mounted for idle rotation on the stud 40' (which preferably also acts as the pivot point for the arm 37 above referred to), and a pair of pinions 40 and 41 meshing with the gear 44a and carrying, respectively, pulleys 42 and 43, the supporting spindles for these combined pulleys and pinions being carried in a three-armed lever 44 also pivoted on the supporting stud 40' above mentioned, and having a rear extension 45, as shown in Fig. 4 and to be hereinafter referred to.

It will be noted that in this instance, the lower pulley 42 is in direct contact with and driven by the underside of the lower run of the belt 33 which travels in the direction of arrow $a$, and therefore operates the pulley 42 and its pinion 40 in the direction of arrow $b$, and rotates through the intervention of an intermediate gear 44a, the feed-screw 32 in the direction of arrow $c$, that is to say "anti-clockwise". In view of the fact that the feed-screw is of the right-hand thread type, it follows that under the existing conditions described, the carriage is traveling in the direction from left to right, as indicated by arrow $d$ in Fig. 1, and causes the shaving knife to traverse the record surface toward the right-hand end thereof, where it will pass a short distance beyond the end of the record surface, when the rotation of the feed-screw and the travel of the carriage will be automatically reversed.

This automatic reversal of the feed-screw rotation is effected by releasing or swinging the pulley 42 away from the belt 33, the particular means employed comprising a lever 46 having a pin-and-slot connection 47 with the three-armed lever 45 above referred to and secured to a rock-bar 48 which is mounted for pivotal movement, as at 49, and provided at its extreme right-hand end with an arm 50 which is so organized that, when the carriage is traveling in the direction indicated in Fig. 1, a projection or lug 51 on the carriage will finally engage the arm 50, depressing the same, and therefore rocking the bar 48 and the arm 46 upward, which movement will result in swinging the pulley 40 away from the belt 33 into the position illustrated in Fig. 6, against the action of a detent or holding spring 52 which serves to hold the three-armed lever 45 in either raised or depressed condition.

By referring to Fig. 6, it will be noted that the detent spring 52 here tends to force or swing the pinion pulley 43 into contact with the upper face of the lower run of the belt 33, which latter still continues in the same direction as before but will now drive the pulley 43 in the direction of arrow $e$ thereby causing the feed-screw to be rotated "clockwise", as indicated by arrow $f$ in Fig. 6. Inasmuch as the feed-nut of the carriage still continues to remain in engagement with the feed-screw 32, the carriage will be caused to travel from right to left, and it will continue to do so until a projection or lug 53 on the carriage 25 will engage a companion arm 54 on the rock-bar 48 and thereby move its lever 46 downward and return it to the position shown in Fig. 4, and in which the feed-screw is again operated in the counter-clockwise direction as first described.

It will be understood that this reverse movement of the feed-screw is effected smoothly and without shock, a feature which is considered important from a practical standpoint, on account of the finished quality of work which it is desired to produce.

As above stated, the present invention comprises an improved construction and organization of the shaving or cutting knives whereby the record-surface is to be smoothed and polished. In view of the fact that this smoothing operation of the record takes place progressively while the carriage is moving in opposite directions, the cutting edges of such knives preferably follow each other closely, and, in order to permit an individual sharpening of these cutting edges, I preferably employ a pair of separate knife blades which are angularly disposed relatively to each other, as clearly shown in Fig. 5, and whose cutting-edges are oppositely effective, each of the knife blades 55 and 56 being secured in the head 57 of a spindle 58 (see Fig. 2) which is capable of being moved longitudinally, or toward and away from the record-surface, in order to effect such adjustment of depth of cut to be taken from said surface, as may be desired.

In the present instance, the spindle 58 is secured, by a set screw 59, to a slide 60 which is adapted to be automatically moved forward and backward by the oscillation of a screw-spindle 61 which passes through the slide and has its forward end in screw-threaded engagement with a stationary block 62 firmly attached to the carriage body 25. A spring 63 serves to force the slide 60 toward the outer or head end of the spindle 61 where a lever 64 is interposed between the screw head 61a and the slide 60, while at the same time such spring 63 will, therefore, serve as a means for taking up all back-lash or longitudinal freedom of the spindle 58 and its cooperative parts relative to the block 62 above referred to. This feature is important because, when the carriage is traveling along the cylinder, the best results can be attained only when the knife has a solid backing.

Figures 2, 3:
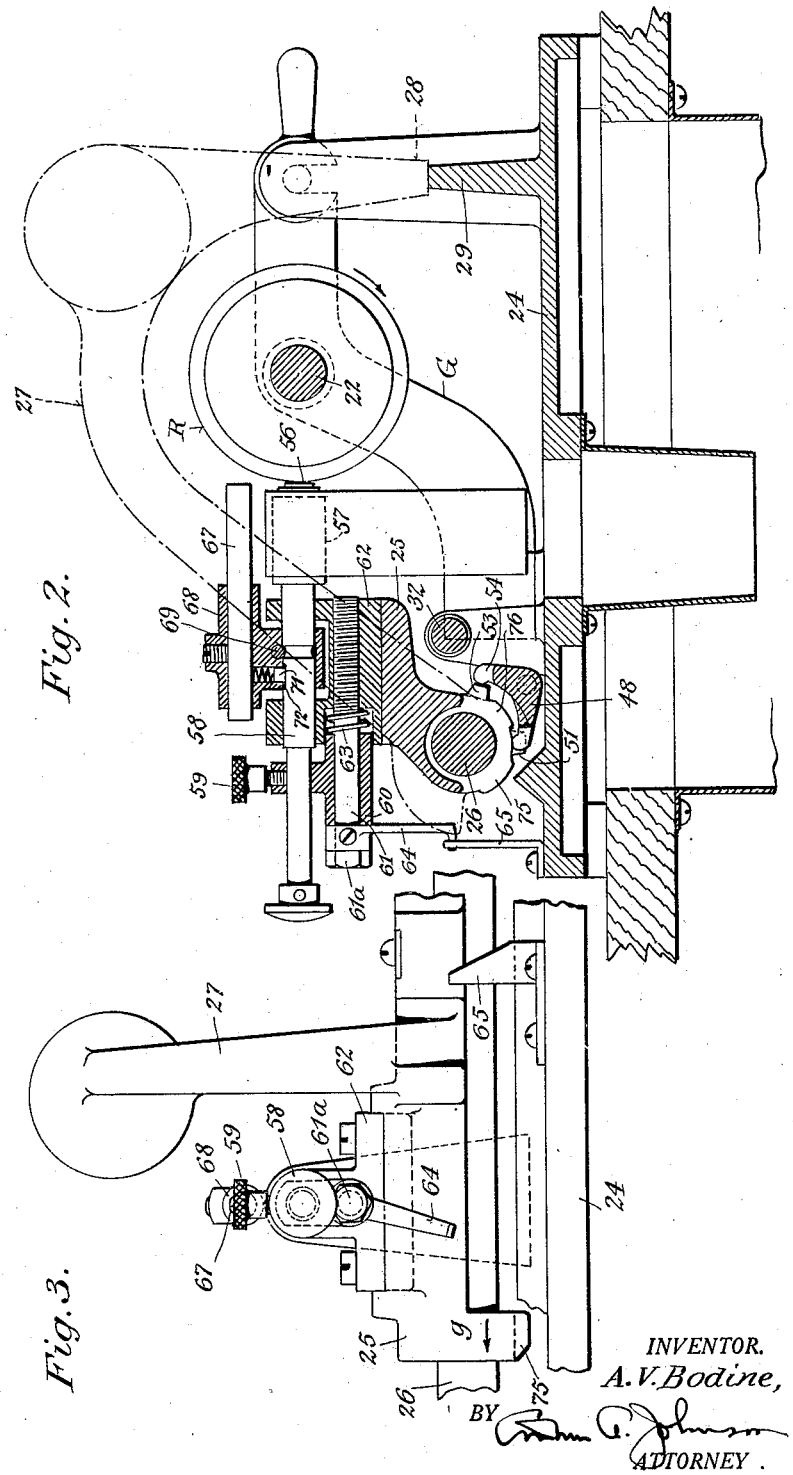
Fig. 2 is a transverse section, taken on the line 2—2, Fig. 1.
Fig. 3 is a fragmentary rear elevation, looking in the direction of arrow 3 in Fig. 1.

In Fig. 1, the carriage is represented as traveling from left to right in the direction of arrow $d$ in its return movement from the left, where the lever 64 has been moved into the position shown in Fig. 3 by an abutment 65 provided on the base of the machine for that purpose. This movement of the lever 64 became effective in advancing said spindle 61 and the knife spindle 58 at the left end of the carriage movement; hence the knife blade 55 is then, as shown in Fig. 1, operative in producing the second finishing or polishing cut of the record.

When the carriage 25 reaches the end of its return movement, the lever 64 will strike another abutment 66 (see Fig. 1) which action will result in rocking the spindle 61 reversely and therefore withdraw the knives from the record-surface to a small extent, depending upon the angular oscillation of the lever 64 and the pitch of the thread 61. This withdrawal of the knives from the record-surface will leave the path clear for the removal of the now finished record, which can be readily accomplished after the supporting gate G (see Fig. 1) has been thrown open.

Another record blank may then be placed on the mandrel, the gate then closed, the carriage being at the right-hand end of its movement, or in its starting position. Now, inasmuch as the new record blank, which has just been placed on the arbor, may be of a different diameter from the previous one, means are provided whereby the cutting edges of the knives may be adjusted relatively to the new record-surface, so as to produce the desired depth of cut. In general practice, a certain depth of cut has been predetermined as being adequate, and has been adopted as a standard; and in order to enable the operator to effect the proper position of the cutting edges of the knives relatively to the surface to be trimmed off expeditiously and uniformly, there is provided a gage device which may be brought to rest against the surface of the record to be trimmed and which stands in this standard predetemined relation to the knife-edge which is to do the cutting. Inasmuch as the cutting knives are still disposed beyond the end of the record-blank, and the gage pin must necessarily be in a position between the ends of the record, it is necessary to mount the gage pin so that it can be swung out of the way of dragging along the record-surface during the travel of the carriage during the trimming operation.

The preferred method of thus mounting the gage mechanism is best shown in Fig. 2, in which the gage pin 67 is held in a collar 68 which is attached to the knife spindle 58, or may be swung around thereon by virtue of a pin 69 which extends laterally through the collar 68 and fits a groove 70 provided therefor on the spindle 58.

The collar 68 may assume any of the positions shown in Fig. 5, the position indicated by 68a being that when the gage pin is in use, while in the positions indicated by 68b and 68c, the gage pin 67 is swung upward and clear of the record, (see also Fig. 2). Means are provided for holding the collar 68 in this inactive position, these means consisting preferably of a spring-pressed member 71 which may find a seat on a flattened face 72 provided therefor on the spindle 58, the latter being held against rotation by the setscrew 59 above described. It should be understood, however, that when a finished record is replaced by another one, and a new adjustment of the cutting edges of the knives relative to the surface of the record becomes necessary, the set-screw 59 must be loosened in order to permit the required longitudinal movement of the knife-carrying spindle 58 with its gage-pin 67 without in any way disturbing the operator-spindle 61, whereby the knife spindle is slightly advanced toward the record at the end of its first half of reciprocation of the carriage when the lever 64 is moved by the abutment 65 as above described.

This really means that, when the knives begin their shaving operation on a new record, the record-surface will be repeatedly shaved and to a depth controlled by the difference in the relative positions of the gage pin and the knife-edges. The knives remain stationary in the carriage until the latter has reached the end of its first movement, namely toward the head or left-end of the base, at which point the lever 64 encounters the abutment 65 and is then swung into the position shown in Fig. 3, thus slightly moving the slide 60 and the knife spindle carried thereby toward the record for an amount commensurate with the angular movement of the lever 64 and the pitch of the screw 61.

During this return movement of the carriage to its starting position, the record-surface will be again shaved to the amount indicated, and under ordinary conditions, this second cut is considered sufficient to leave the record in proper condition to be used in the recording machine. If, however, it should be desired or necessary (on account of extra deep recording impressions) to take another cut over the record-surface, the gage will again have to be used to reset the knives to the now decreased diameter of the record.

The operation of the machine thus far described is as follows:

Rotative movement is imparted to the record-carrying arbor by virtue of a pulley 80a secured to the arbor spindle and driven by a belt 81 which is operated by a motor (not shown) and secured to the underside of the base plate or the table upon which it is supported. The record R to be shaved can readily be placed upon the arbor 21 after the gate G has been swung open around its fulcrum 82, the gate being subsequently closed again into the position shown in Fig. 1 and the arbor spindle 22 being then supported at both ends thereof. In order to facilitate the placing of the record R on the arbor spindle, the carriage 25 should be tilted upwardly and preferably located at the extreme right-hand-end of the frame and the supporting rod 26 carried thereby. After the record has been properly placed on the arbor, the carriage is lowered until the bearing shoe 28 thereof comes to rest upon the front rail 29 on which it is adapted for sliding movement longitudinally of the rail and in parallelism with the guide rod 26. This position of the carriage is now such that the knives, when moved toward the record surface, will be in proper linear location relative thereof to perform their function in a correct manner. The knives may now be adjusted to produce the proper depth of cut, by first swinging the collar 68 into the position 68a illustrated in Fig. 5, and then, after the set-screw 59 has been loosened, the knife-carrying spindle 58, together with the gage pin 67, may be moved forward or toward the record surface until the front end of the gage pin 67 encounters the surface of the record, whereupon said screw 59 should be again tightened, and the collar 68 be swung upward and out of the way into the position 68b shown in Figs. 2 and 5.

Upon lowering the goose neck the lug 51 will engage the arm 50 as hereinbefore described to cause rotation of the feed screw 32 in the direction of arrow f, Fig. 6, by virtue of the intervening driving mechanism which comprises the pulley 34 fixed on the arbor-spindle 22 the belt 33, the lower run of which has its upper side frictionally operating the pulley and pinion member 43 and 41, thus operating the intermediate gear 44a and the pinion 39 which latter is firmly secured to the feed-screw 32.

The cutting knives will, therefore, be moved longitudinally of the surface of the record, and the primary blade 56 will take a roughing-cut thereof until the carriage 25 has reached the end of its movement toward the left, in which position both knives are free of the record-surface and will have been slightly advanced by the swinging movement of the lever 64 caused by its encountering the stationary abutment 65 and therefore slightly rotating the screw spindle 61 which constitutes the actuating member for longitudinally moving the knife-carrying spindle 58.

At the extreme final movement of the carriage toward the left, the rotative movement of the feed-screw 32 will also have been reversed by the operation of the rock-bar 48 by the arm 54, which will have been depressed by the lug 53 on the carriage, thereby swinging the lever 46 and the three-armed lever 44 so as to bring the pulley 42 into frictional contact with the under surface of the lower run of the belt 33, the pinion 40 then operating the intermediate 44a and the feed-screw pinion 39 which is operated thereby in a reverse direction. The carriage will, therefore, travel from left to right and cause the knife blade 55 to take a finishing cut over the record-surface, it being understood that the wax-chips removed from the surface are carried through a chute into a suitable receptacle, as usual in machines of this class. When the carriage 25 arrives at the end of its movement toward the right, it may be stopped by raising the goose neck, when rotation of the feed screw will be discontinued as hereinbefore described. It will be understood, however, that the feed screw may be made of such a length that the carriage will stop automatically after completing its finishing cut by reason of the feed nut being carried beyond the end of the feed screw.

In Figs. 8 to 11, inclusive, I have illustrated a modification of the feed-screw and its driving connection with the spindle of the record mandrel. In this instance, the feed-screw 80 is of the so-called "switch-back" type of groove which is of comparatively coarse pitch and of sufficient width to receive a shoe 100 (see Fig. 10) attached to the lower end of a spindle 101 which is journaled in a bearing arm 83 secured to the carriage 25 of the machine. The shoe 100 riding in the groove 102 or the feed-screw will remain in this position and may be normally held therein by a detent spring-blade 84 secured to the bearing plate 83 and having its free end adapted to enter notches 85 or 86, provided in a head 87 which is secured to the upper end of the shoe-spindle 101, it being understood that when the shoe 100 passes through the end or reverse portion 85a of the groove, it will naturally be deflected in its course and cause the end of the detent spring to engage the other notch 86 in the head 87 of the shoe-spindle.

In this particular instance, the feed-screw 80 carries a bevel-gear 88 which is driven by a bevel-pinion 89 secured to a shaft 90 which is journaled in suitable bearings in a bracket 91 attached to a side frame of the machine. The other end of the shaft 90 has a worm gear 92 operated by a worm 93 on the spindle of the record-arbor.

Fig. 11 illustrates the other end of the feed-screw 80 which may comprise a switch-back portion 85b for automatically deflecting the shoe 100 from one groove-run into the other, in which case the carriage would be continuously traveling to and fro, unless such movement is stopped by raising the goose neck 27 of the carriage and therefore throwing the shoe 100 entirely out of engagement with the feed-screw.

On the other hand, if it should be desired to bring the carriage 25 automatically to a stop when it again reaches its starting point, the outer wall portion 85c (see Fig. 11), may be entirely removed so that, in that case, the carriage would move only until the shoe runs beyond the pale of the groove.

Variations and modifications may be made within the scope of this invention, and portions of the improvements may be used without others.

Having thus described the invention, what is claimed as new and for which it is desired to obtain Letters-Patent, is:—

1. In a shaving machine, the combination of a record-support; a cutter; a gage member connected therewith, said connection being such that the cutter and gage member are fixed against relative longitudinal movement; and means for moving said gage member into contact with the surface of the record for positioning the cutter relatively thereto, said gage member being pivoted to the cutter for movement out of contact with said record without disturbing the position of the cutter.

2. In a shaving machine, the combination of a record-support; a carriage movable in opposite directions; a cutter on the carriage; means for adjusting said cutter relatively to the surface of the record; a gage member controlling said adjustment and operable at either end of the carriage-movement; and additional means for automatically adjusting the cutter relatively to the surface of the record near the end of each movement of the carriage longitudinally of the record support.

3. In a shaving machine, the combination of a record-support; a carriage movable longitudinally thereof; a cutter mounted on said carriage; and means for reciprocating said carriage comprising a driving member and a rock-bar operable by and during the reciprocation of said carriage for reversing said driving member to cause reversal of the carriage-movement.

4. In a shaving machine, the combination of a record-support; a cutter; a carriage supporting the same and tiltable for moving said cutter away from the record-support; means for reciprocating said carriage longitudinally of said support; and means controlled by the tilting of said carriage for stopping the reciprocating means.

5. In a shaving machine, the combination of a record-support; a cutter; a gage member connected therewith, said connection being such that the cutter and gage member are fixed against relative longitudinal movement; means for moving said gage member into contact with the surface of the record to position the cutter relatively thereto, said gage-member being pivoted to the cutter for movement out of contact with said record without disturbing the position of the cutter; and means for retaining said gage member in its operative position.

6. In a shaving machine, the combination of a record-support; a cutter; a carriage supporting the same and movable longitudinally of the support; and a gage member connected with said cutter and movable to opposite sides thereof for positioning said cutter relatively to the record-support at either end of the carriage-movement.

7. In a shaving machine, the combination of a record-support; a cutter; a carriage supporting the same; means for reciprocating said carriage longitudinally of the support; and a member controlled by the movement of said carriage for reversing the direction of movement of the reciprocating means, said carriage being tiltable for locking said member in a position for stopping the reciprocating means.

8. In a shaving machine for wax cylinder records, in combination, a frame, a record-support rotatably mounted therein, a carriage mounted on said frame for movement along said record-support, means for advancing said carriage, a screw mounted in said carriage for movement toward and away from said record-support, a toolholder slidably mounted in said carriage and connected to move with said screw, screw-actuating means, and an abutment on said frame adapted to engage said actuating means during the advance of said carriage beyond a predetermined point to produce a forward feed of said toolholder.

9. In a shaving machine for wax cylinder records, in combination, a frame, a record-support rotatably mounted therein, a carriage mounted on said frame for movement along said record-support, means for reciprocating said carriage to produce an advance and a return travel thereof, a screw mounted in said carriage for movement toward and away from said record-support, a toolholder slidably mounted in said carriage and connected to move with said screw, screw-actuating means, an abutment on said frame adapted to engage said actuating means during the advance of said carriage beyond a predetermined point to produce a forward feed of said toolholder, and a second abutment on said frame adapted to engage said actuating means during the return of said carriage beyond a predetermined point to produce a rearward feed of said toolholder.

10. In a shaving machine for wax cylinder records, in combination, a frame, a record-support rotatably mounted therein, a carriage mounted on said frame for movement along said record-support, means for reciprocating said carriage to produce an advance and a return travel thereof, a screw mounted in said carriage for movement toward and away from said record-support, a toolholder slidably mounted in said carriage and connected to move with said screw, screw actuating means, an abutment on said frame adapted to engage said actuating means during the advance of said carriage beyond a predetermined point to produce a forward feed of said toolholder, a second abutment on said frame adapted to engage said actuating means during the return of said carriage beyond a predetermined point to produce a rearward feed of said toolholder, and a pair of tools secured in said toolholder and adapted respectively to cut during the advance and return travel of said carriage.

11. Apparatus in accordance with claim 8, in which the abutment is adjustably mounted on said frame.

12. Apparatus in accordance with claim 9, in which said two abutments are adjustably mounted upon said frame.

13. In a shaving machine for record-tablets, in combination, a frame, a record-support rotatably mounted therein, a carriage mounted on said frame for feeding movement along said record-support, means for advancing said carriage, a tool-holder slidably mounted in said carriage for movement toward and away from said record-support, means mounted on said carriage and movable to produce a feeding movement of said tool-holder, means on said carriage for actuating said last named means, and means on said frame adapted to engage said actuating means during movement of said carriage beyond a predetermined position of said carriage to produce a feeding movement of said tool-holder.

14. The combination in a machine for shaving sound-record tablets, of a tablet supporting mandrel, driving means for said mandrel, a carriage, means for moving the carriage along the mandrel, shaving means mounted on said carriage, and means actuated by the carriage during the continued movement of the carriage by said driving means after the completion of a shaving cut to advance the shaving means toward the mandrel.

15. The combination in a machine for shaving sound-record tablets, of a tablet supporting mandrel, driving means for said mandrel, a carriage, means for moving the carriage along the mandrel in a direction operative to shave a record, shaving means mounted on said carriage, and means operated by the carriage as it is advanced in the said direction by the driving means to advance the shaving means toward the mandrel.

16. The combination in a machine for shaving sound-record tablets, of a tablet supporting mandrel, driving means for said mandrel, a carriage, means for causing relative movement longitudinally of the mandrel between the carriage and the mandrel in a path to shave a record, shaving means mounted on said carriage, and means responsive to the operation of said driving means and operative during continued movement of the carriage in the same direction to move the shaving means relative to the mandrel.

17. The combination in a machine for shaving sound-record tablets, of a tablet supporting mandrel, driving means for said mandrel, a carriage, means for moving the carriage along the mandrel, shaving means mounted on said carriage, and means actuated by the carriage during the continued movement of the carriage by said driving means after the completion of a shaving cut to advance the shaving means toward the mandrel a predetermined amount.

18. The combination in a machine for shaving sound-record tablets, of a tablet supporting mandrel, driving means for said mandrel, a carriage mounted for movement along said mandrel, driving means for said carriage to produce a record-shaving movement thereof, a knifeholder mounted on said carriage for movement toward and away from said mandrel, and means operated by the carriage during a portion of its record-shaving movement for advancing said knifeholder toward the mandrel.

Signed at Bridgeport, in the county of Fairfield, and State of Connecticut, this 31st day of October, 1927.

ALFRED V. BODINE.

CERTIFICATE OF CORRECTION.

Patent No. 1,837,699.                                 Granted December 22, 1931, to

ALFRED V. BODINE.

It is hereby certified that error appears in the printed specification of the above numbered patent requiring correction as follows: Page 4, before line 1, insert the following paragraphs:

Means are provided whereby the rotation of the feed screw itself may be manually interrupted upon completion of a carriage movement in either direction. Rotation of the feed screw may be interrupted by tilting the three-armed lever 44 into such position that neither of the pinion pulleys 42 and 43 are in engagement with the lower run of the belt 33, this position being shown in Fig. 7, in which the goose neck 27 of the carriage is shown as being swung upward to bring a cam lug 75 formed on the carriage hub into engagement with the arm 50 of the rock-bar 48, thus holding the rock-bar against movement from the position shown. Movement of the rock-bar 48 by the cam lug 75 into the position shown in Fig. 7 causes arm 46 to swing the three-armed lever 44 into a neutral position so that both of the pulleys 42 and 43 are then free of the belt 33, and the pulleys 42 and 43, as well as the pinions and intervening gears connecting the same with the feed screw, are at a standstill. When the goose neck 27 is again lowered, the cam 75 will be withdrawn from the arm 50 and the lug 51 will engage the arm 50 of the rock-bar 48 and move the arm 46 and the three-arm lever 45 into the position shown in Fig. 6, thereby restoring rotating movement of the feed screw.

To interrupt rotation of the feed screw when the carriage is at its extreme left hand movement in Fig. 1, a cam lug 76 is provided on the carriage hub to engage the arm 54 of the rock-bar when the goose neck 27 is swung upward, the arrangement of the lug 76 being such as to swing the three-arm lever 44 into neutral position and hold the pulleys 42 and 43 out of engagement with the belt 33. When the goose neck 27 is again lowered, lug 76 will be withdrawn from arm 54 and lug 53 will engage arm 54 of the rock-bar 48, and move the arm 46 and the three-arm lever 45 into the position shown in Fig. 4, thereby restoring the rotating movement of the feed screw.;

and that the said Letters Patent should be read with this correction therein that the same may conform to the record of the case in the Patent Office.

Signed and sealed this 23rd day of February, A. D. 1932.

(Seal)                                                                                    M. J. Moore,
                                                                                  Acting Commissioner of Patents.